United States Patent [19]
Li et al.

[11] Patent Number: 6,132,183
[45] Date of Patent: Oct. 17, 2000

[54] COMPRESSOR MOUNTING

[75] Inventors: Wenlong Li, Fayetteville; Philip L. Lavrich, Manlius; Kevin B. Dunshee, Camillus, all of N.Y.

[73] Assignee: Carrier Corporation, Syracuse, N.Y.

[21] Appl. No.: 09/197,873

[22] Filed: Nov. 23, 1998

[51] Int. Cl.$^7$ .............................. F04B 17/00; F04B 35/00
[52] U.S. Cl. ........................................... 417/363; 248/638
[58] Field of Search ..................... 417/363, 313; 62/296, 297; 248/676, 638

[56] References Cited

U.S. PATENT DOCUMENTS

| | | | |
|---|---|---|---|
| 3,199,774 | 8/1965 | Lowell | 417/366 |
| 4,236,607 | 12/1980 | Halwes et al. | 188/1 B |
| 4,306,708 | 12/1981 | Gassaway et al. | 267/141.3 |
| 5,277,554 | 1/1994 | Elson | 417/363 |
| 5,953,932 | 9/1999 | Kwon | 62/297 |
| 5,965,851 | 10/1999 | Herreman et al. | 181/200 |

*Primary Examiner*—Henry C. Yuen
*Assistant Examiner*—Mahmoud M. Gimie

[57] ABSTRACT

Vertical support and vibration isolation of a compressor casing is provided in single large vibration isolator. Additionally side torsion isolators are axially and radially spaced from the large vibration isolator and are circumferentially spaced from each other. The compressor may be located in a shell supporting the side vibration isolators.

26 Claims, 9 Drawing Sheets

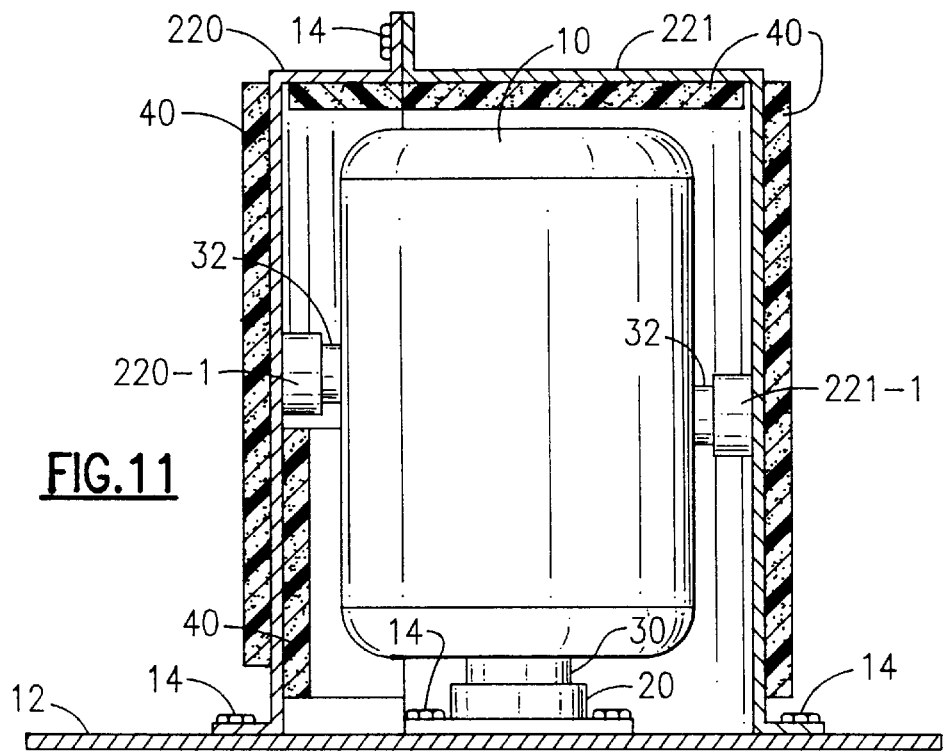
FIG.11
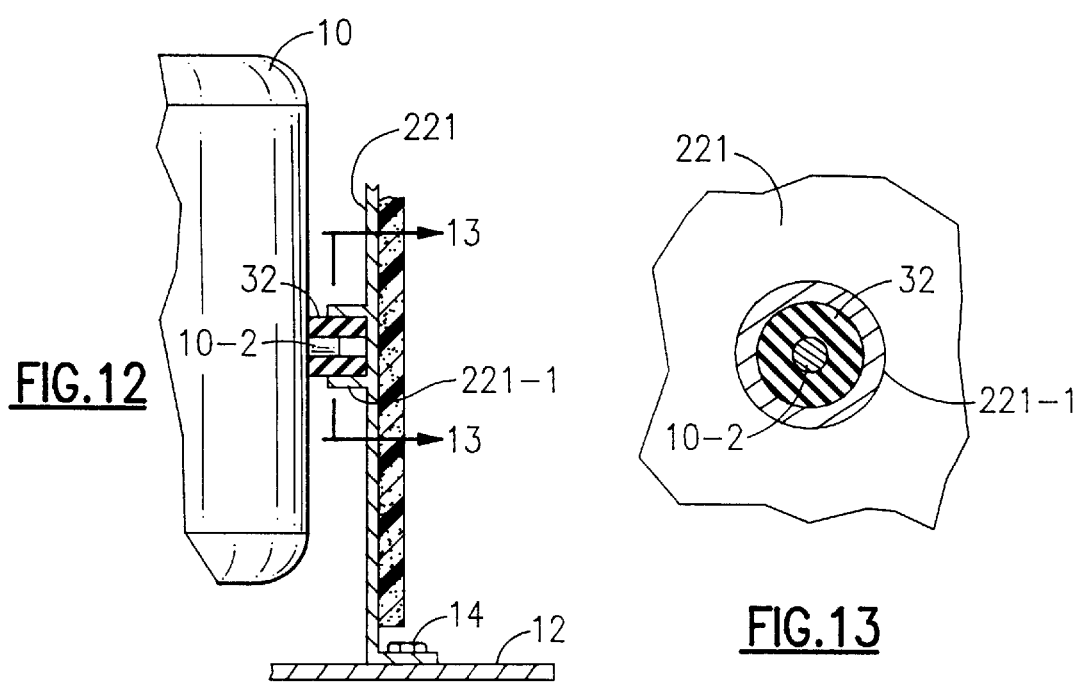
FIG.12
FIG.13

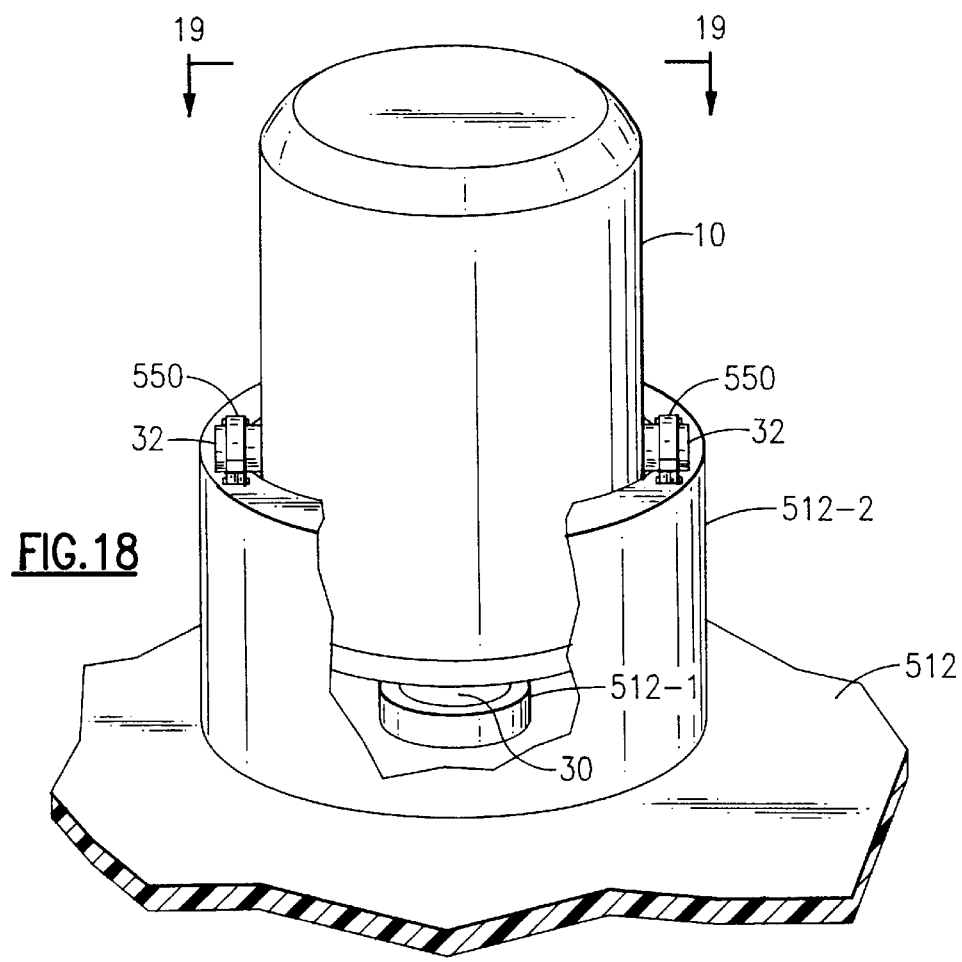
FIG.18
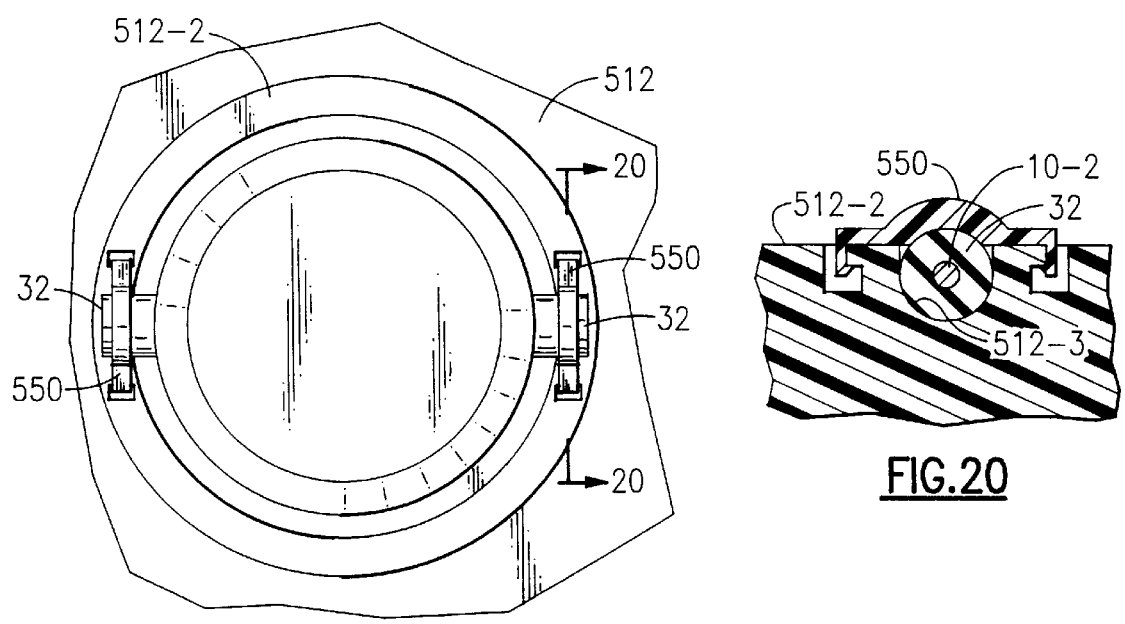
FIG.19
FIG.20

COMPRESSOR MOUNTING

BACKGROUND OF THE INVENTION

Compressors used in refrigeration, air conditioning and heat pump systems are normally mounted to the associated base pan through a vibration isolating mounting assembly. Specifically, compressors are commonly mounted to the base pan of a window room air conditioner, of a display case unit, of a split unit with the compressor indoors, or of a condensing or outdoor unit. In such installations, it is desirable to damp vibrations and the resultant noise caused by operation of the compressor. A common arrangement is to locate elastomeric grommets between the base or feet of the compressor and the base pan upon which it is mounted. The grommets are attached to the compressor feet and the compressor, with attached grommets, is set on the base pan. Threaded studs (with sleeves) are then pushed through the grommets to secure the connection.

The grommets support the weight of the compressor and are radially spaced from the center of gravity of the compressor to prevent it from tipping. While the spaced supports provide stability, they also increase the torsional restoring forces due to their distance from the axis of rotation. The grommets serve to vibrationally and acoustically isolate the compressor from its support. The resonance frequencies of the compressor torsional and rocking modes are inherently high in such a mounting arrangement, tending to fall into the proximity of the compressor speed and to cause vibration and noise problems. To alleviate these problems, the grommets are normally made very soft in the transverse directions which may result in excessive movement during shipping. Excessive movement during shipping can cause damage to the compressor and/or its connections to the other components in the system.

SUMMARY OF THE INVENTION

A single, relatively large, vibration isolator is located under the center of gravity of the compressor to support most, if not all, of the weight of the compressor. Two, or more, smaller, torsion isolators are located at positions between 20% and 100% of the height of the compressor and, nominally, circumferentially spaced no more than 180°, in either direction, between adjacent torsion isolators. The smaller isolators need not be symmetrically located in height or circumferential extent. In a preferred embodiment the small isolators are located on a mounting casing having an acoustical lining.

It is an object of this invention to reduce forces transmitted to the base pan from a compressor.

It is another object of this invention to provide side support to a compressor casing.

It is an additional object of this invention to eliminate the compressor base plate and the accompanying sound radiation.

It is another object of this invention to attenuate compressor generated sound.

It is an additional object of this invention to reduce compressor movement during shipping.

It is a further object of this invention to provide improved vibration isolation of a compressor. These objects, and others as will become apparent hereinafter, are accomplished by the present invention.

Basically, vertical support, vibration isolation and sound attenuation of a compressor is provided by a single vibration isolator. Additional torsion isolators are located at the sides of the compressor at circumferentially spaced locations. A shell which may be a separate structure or part of the torsion isolator support structure may be provided and acoustically lined/covered.

BRIEF DESCRIPTION OF THE DRAWINGS

For a fuller understanding of the present invention, reference should now be made to the following detailed description thereof taken in conjunction with the accompanying drawings wherein:

FIG. 11 is a front view of a hermetic compressor employing a fourth embodiment of the compressor mounting of the present invention;

FIG. 12 is a partially sectioned view of a portion of FIG. 11;

FIG. 13 is a sectional view taken along line 13—13 of FIG. 12;

FIG. 18 is a partially cutaway pictorial view of a hermetic compressor employing an eighth embodiment of the compressor mounting of the present invention;

FIG. 19 is a view taken along line 19—19 of FIG. 18;

FIG. 20 is a sectional view taken long line 20—20 of FIG. 19;

DESCRIPTION OF THE PREFERRED EMBODIMENTS

Figure 1:
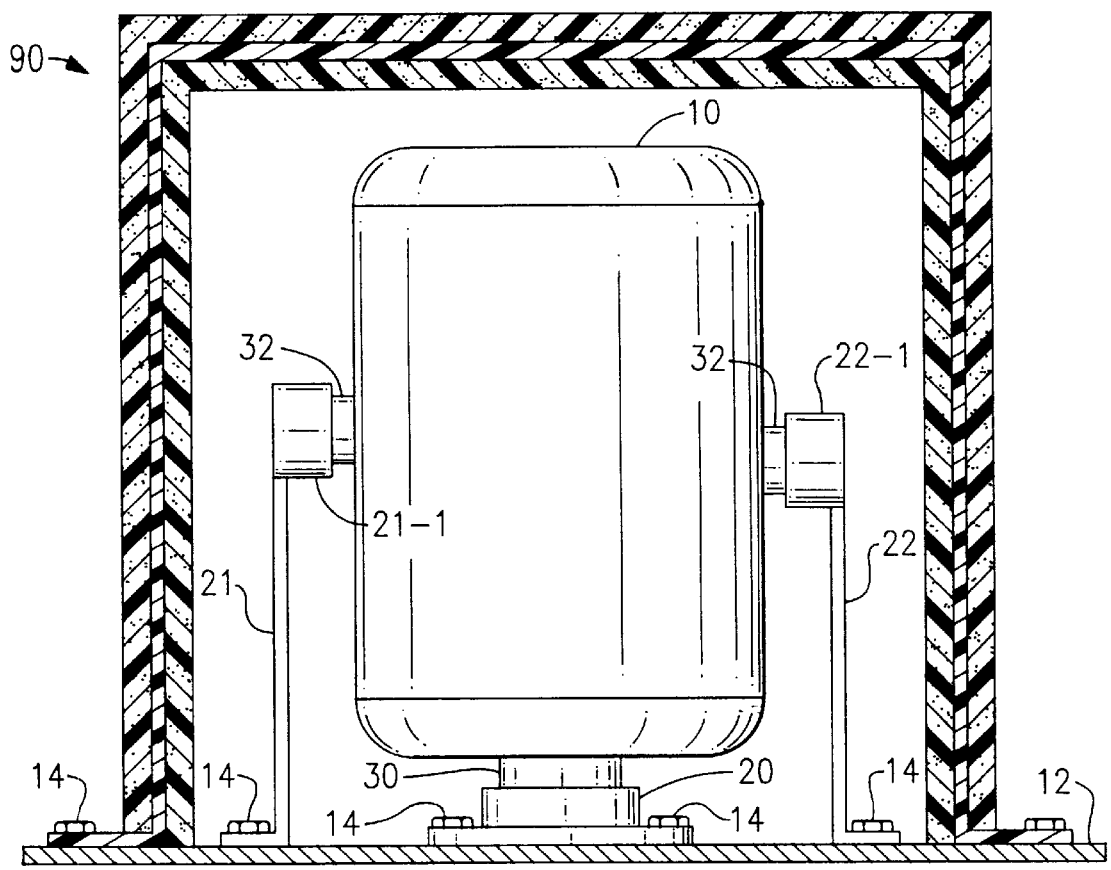
FIG. 1 is a front view of a hermetic compressor employing the compressor mounting of the present invention and provided with a separate shell.
Figure 2:
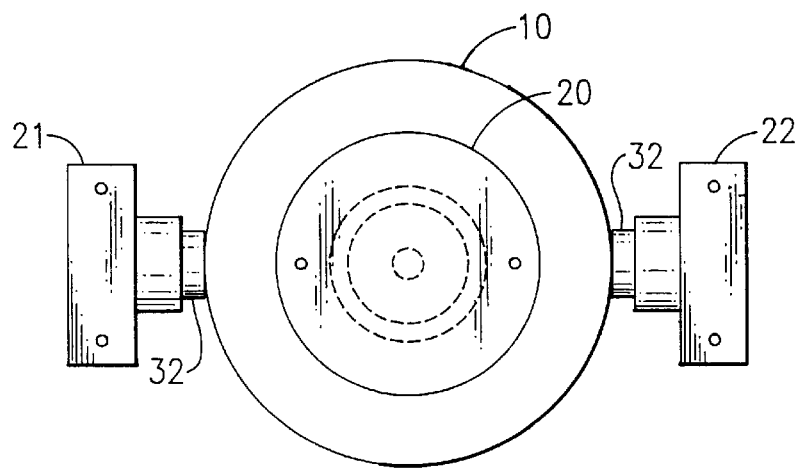
FIG. 2 is a bottom view of the compressor and mounting of FIG. 1.

In the Figures, the numeral 10, or increments of one hundred thereof, generally designates a hermetic compressor. To avoid unnecessary complications, the piping, wiring, etc. associated with compressor 10 have been omitted in the drawings. It will be understood that such structure must be accommodated as by the placement of mounting structure and in providing holes in shell structure, or the like, for supplying and delivering refrigerant. Compressor 10 is supported on suitable structure such as the base pan 12 of a window unit, display case unit, the condensing or outdoor unit of an air conditioning system, etc. through a compressor mounting. Referring specifically to FIGS. 1 through 4, the compressor mounting is illustrated as being made up of a bottom vibration isolator mounting 20 and side torsion isolator mountings 21 and 22. Mounting 20 has an annular extension 20-1 which defines a recess for receiving annular vibration isolator 30 which supports the weight of compressor 10 and is made of a suitable resilient material such as neoprene or other rubbers. Mountings 20, 21 and 22 are suitably secured to base pan 12 as by bolts 14. Torsion isolators 32 are received in recesses defined by annular extensions 21-1 and 22-1, respectively, of mountings 21 and 22 which are in the nature of arms and are located at positions in the range of 20% to 100% of the height of compressor 10. The torsion isolators 32 need not be vertically or circumferentially symmetrically located. However, it is generally preferred that the spacing between isolators 32 does not exceed 180°, in either direction, which would require circumferential symmetry where two isolators 32 are used. Isolators 32, like isolators 30, are made of a suitable resilient material such as neoprene or other rubbers. However, isolators 32 are preferably made softer/more deformable. Isolator 30 supports most, if not all, of the weight of compressor 10. The smaller isolators 32 have much lower stiffness in all directions and are primarily used to restrain transverse motions of compressor 10. Accordingly, the natural frequencies of the torsional and rocking modes can be essentially tuned independently to any desired values. Additionally, such an isolation arrangement will be much stronger in the transverse directions thereby avoiding excessive compressor motion during shipping and handling.

Figure 3:
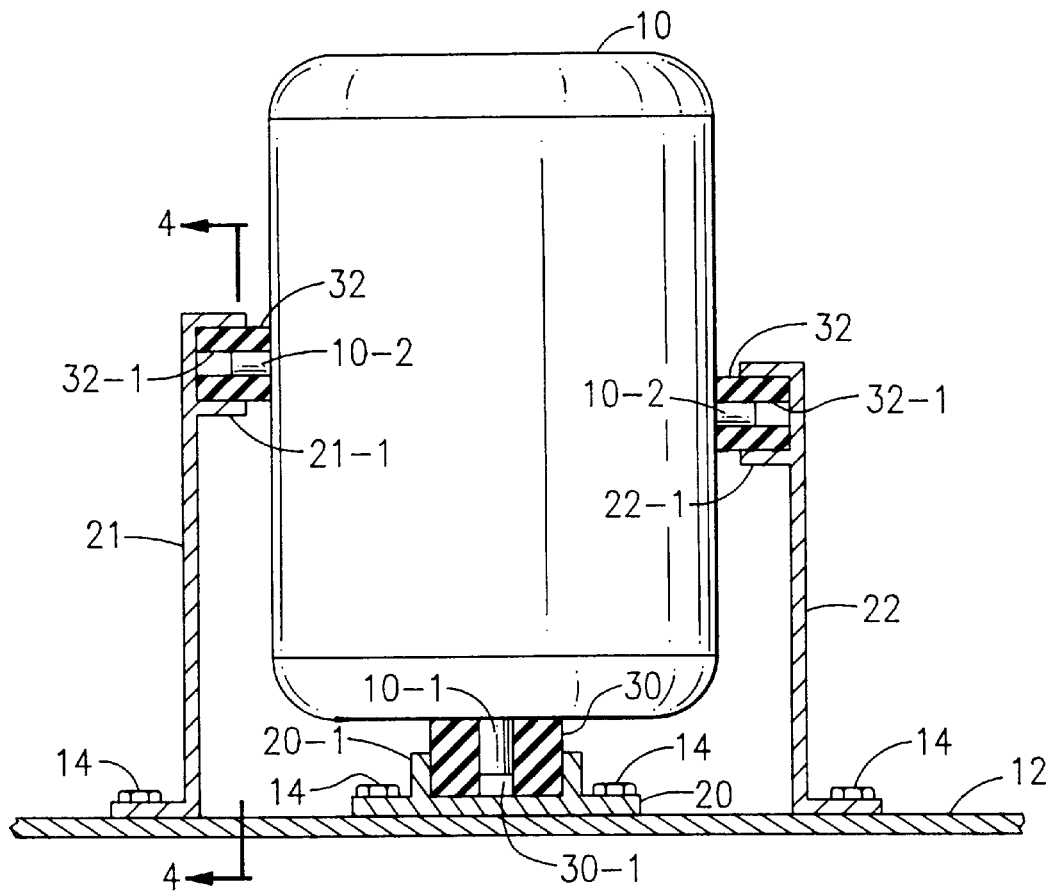
FIG. 3 is a partially sectioned view corresponding to FIG. 1.
Figure 4:
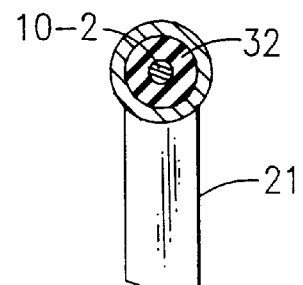
FIG. 4 is a sectional view taken along line 4—4 of FIG. 3.

FIGS. 3 and 4 show the details of the support of compressor 10 by isolators 30 and 32. Specifically, compressor 1 has a nominally axially located pin, or the like, 10-1 welded or otherwise suitably secured to compressor 10. Pin 10-1 is received in bore 30-1 of isolator 30 such that compressor 10 rests on isolator 30 and most, if not all, of the weight of compressor 10 is supported by isolator 30. Isolator 30 snugly receives pin 10-1 in bore 30-1 and is, in turn, snugly received in the recess defined by annular extension 20-1. Accordingly, movement of pin 10-1, and thus compressor 10, is restricted. Additionally, at least two pins 10-2 are welded or otherwise suitably secured to the side of compressor 10 in circumferentially spaced, radially extending positions. Pins 10-2 are received in bores 32-1 of isolators 32. Isolators 32 are, in turn received in annular extensions 21-1 and 22-1, respectively. Isolators 32 support little, if any, of the weight of compressor 10 but are snugly received in annular extensions 21-1 and 22-1 and snugly receive pins 10-2 in bores 32-1 such that compressor 10 is resiliently held against tipping or torsional movement.

Referring specifically to FIG. 1, a shell 90 may be placed over compressor 10 and secured to base pan 12 by bolts 14, or the like. Shell 90 can be made of any suitable material, such as polymer, and is intended to provide sound dampening. Preferably, shell 90 is lined and/or covered with acoustical lining 40. Acoustical lining 40 may be of any suitable material such as foam or fiberglass. Shell 90 would have to be provided with openings to accommodate piping wiring, etc. and may be made in multiple or hinged sections to facilitate installation. Since shell 90 is not part of the compressor mounting structure, it may be used with any of the disclosed embodiments which do not have a shell.

Figure 5:
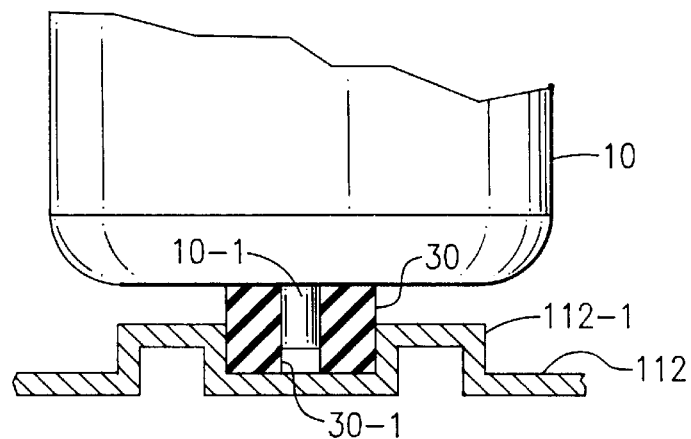
FIG. 5 is a sectional view of a first modified bottom vibration isolator mounting.
Figure 6:
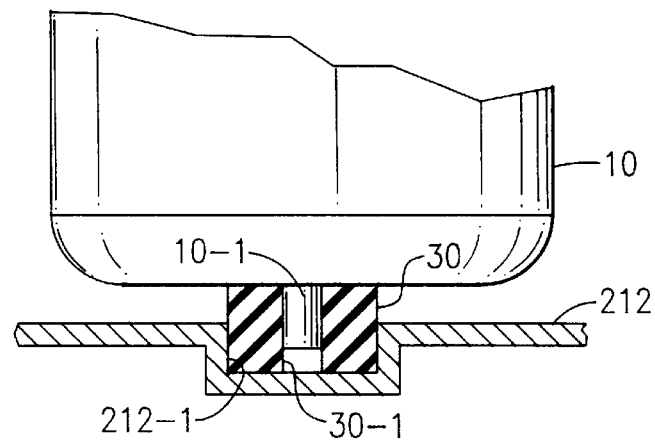
FIG. 6 is a sectional view of a second modified bottom vibration isolator mounting.

Referring now to FIGS. 5 and 6, mounting 20 has been eliminated by modifying the metal base pan 12 to receive vibration isolator 30 in the manner of annular extension 20-1. In the embodiment of FIG. 5, base pan 112 has been modified to have annular extension 112-1 which defines a recess which receives isolator 30. In the embodiment of FIG. 6, base pan 212 has been modified to have circular depression 212-1 which receives isolator 30. The embodiments of FIGS. 5 and 6 would function the same as the corresponding structure of the embodiment of FIGS. 1–4.

Figure 7:
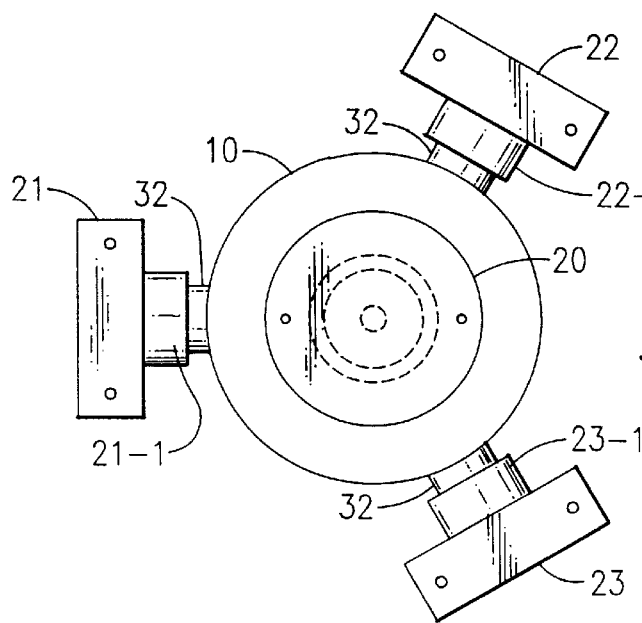
FIG. 7 is a bottom view of a hermetic compressor and first modified torsion isolator mounting arrangement.

In the embodiment of FIG. 7, the embodiment of FIGS. 1–4 has been modified by adding a third side torsion isolator mounting 23 having an annular extension 23-1. Isolators mountings 21 and 22 are, preferably, repositioned so that the circumferential spacing between isolator mountings 21, 22 and 23 is more evenly spaced. The torsion isolators 32 may be located at locations between 20% and 100% of the height of compressor 10, but do not have to be at the same height.

Figure 8:
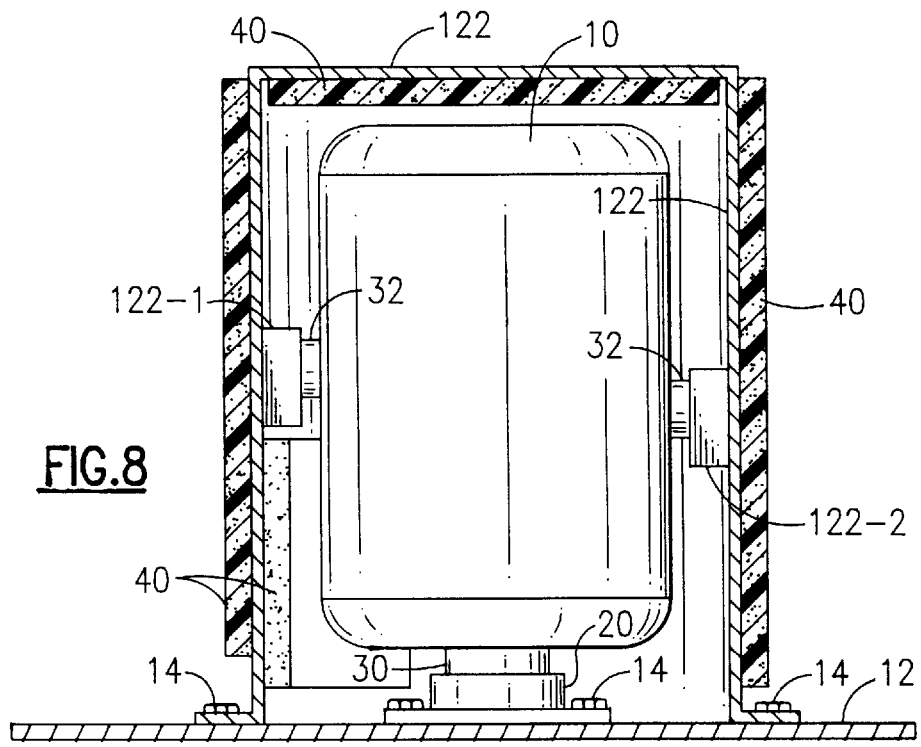
FIG. 8 is a front view of a hermetic compressor employing a third embodiment of the compressor mounting of the present invention.
Figure 9:
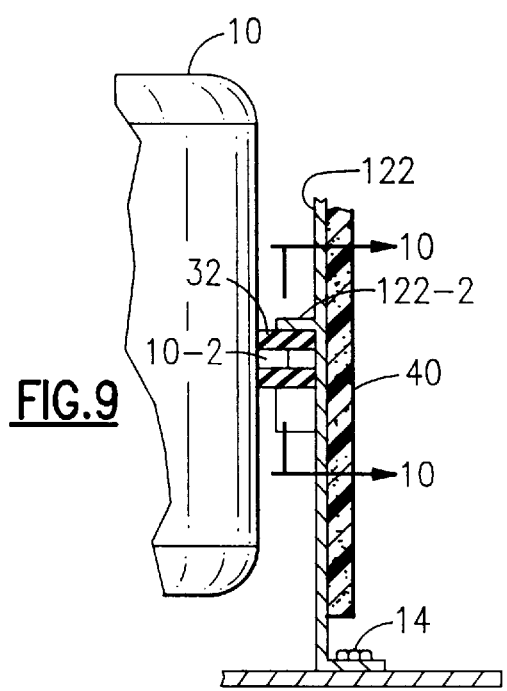
FIG. 9 is a partially sectioned view of a portion of FIG. 8.
Figure 10:
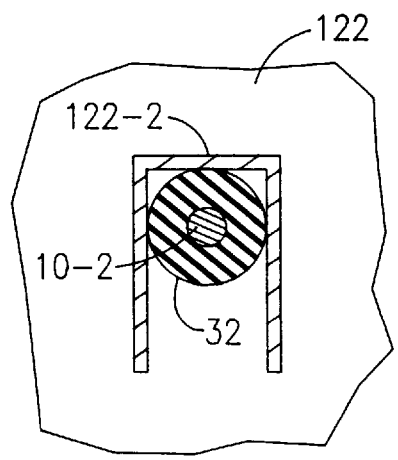
FIG. 10 is a sectional view taken along line 10—10 of FIG. 9.

In FIGS. 8–10, the mounting arrangement of FIGS. 1–4 has been modified by replacing side torsion isolator mountings with a mounting shell 122 which fully, or partially encloses compressor 10 and is, preferably, at least partially lined and/or covered with acoustical lining 40. As illustrated, there are several placements of acoustical lining 40. As is best shown in FIG. 10, side torsion isolator mountings 122-1 and 122-2 are suitably secured to or are integral with shell 122 and are slots in the form of inverted U's relative to pins 10-2. In putting mounting shell 122 in place, compressor 10 is initially located such that pin 10-1 is located in bore 30-1 and compressor 10 is supported by isolator 30 which is received in mounting 20 or its equivalent. Isolators 32 are placed on pins 10-2 prior to setting shell 122 in place. With compressor 10 in place on isolator 30 and with isolators 32 in place on pins 10-2, shell 122 is placed over compressor 10 and mountings 122-1 and 122-2 engage and receive isolators 32. When shell 122 is in place, it is secured to base pan 12 by bolts 14. To permit the movement of shell 122 past isolators 32, it is necessary that the interior portion of shell 122 below mountings 122-1 and 122-2 is unlined. Other areas such as those dealing with the suction and discharge lines, the power supply etc. may also require an accommodation by shell 122 in the nature of openings, slots, etc. Ultimately, the support of compressor 10 in the embodiment of FIGS. 8–10 is the same as that of FIGS. 1–4 but there is the additional benefit of sound damping due to shell 122 and its being lined and/or covered with acoustical lining 40. The acoustical lining 40 would, typically be made of foam or fiberglass. Although shell 122 is illustrated and described as being in one piece, it can be made of more than one piece as where required for installation due to the location of the piping etc.

The embodiment of FIGS. 11–13 differs from the embodiment of FIGS. 8–10 in that the shell is made up of at least two parts, 220 and 221, which may be hinged together or separate parts and which are bolted or otherwise suitably secured together. Shell portions 220 and 221 have several placements of acoustical lining 40. Isolator mountings 220-1 and 221-1 are suitably secured to or are integral with shell portions 220 and 221, respectively, and are in the form of annular extensions corresponding to 21-1 and 21-2 of the FIGS. 1–4 embodiment. Assembly of shell portions 220 and 221 relative to compressor 10 is more flexible in that shell portions 220 and 221 and/or compressor 10 can be moved radially with respect to pins 10-2 and corresponding annular extensions 220-1 and 221-1. Preferably, in assembly, compressor 10 is in place with respect to isolator 30 prior to putting shell portions 220 and 221 in place with respect to compressor 10 and being secured together and to pan 12 by bolts 14. However, if necessary, or desired, compressor 10 can be located in assembled shell portions 220 and 221 prior to their being located relative to vibration isolator 30 in annular extension 20-1, or the like, and prior to securing assembled shell portions 220 and 221 to base pan 12.

Figures 14, 15:
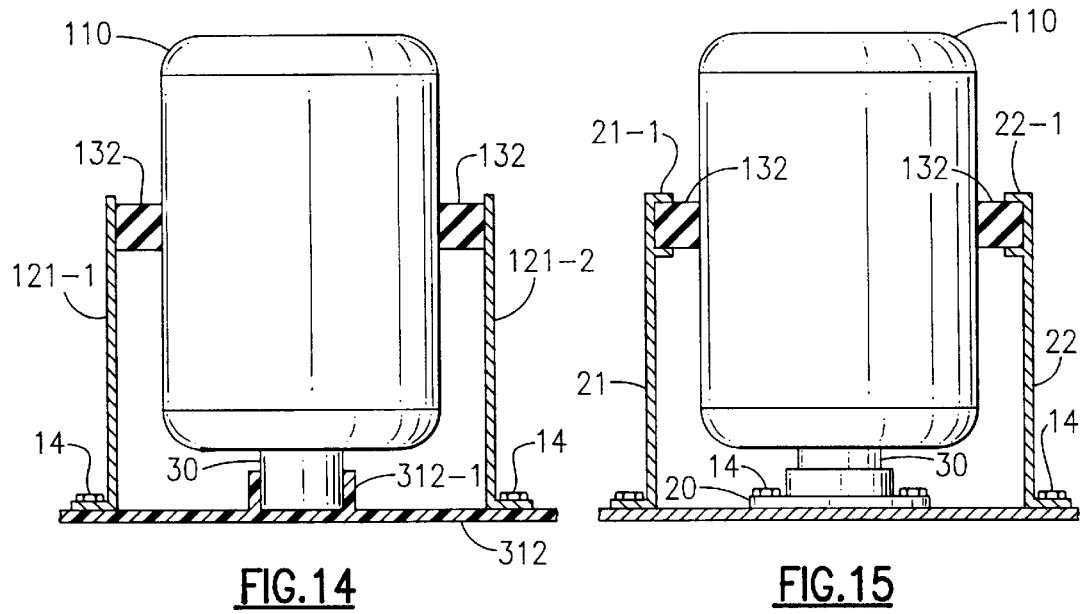
FIG. 14 is a partially sectioned view of a hermetic compressor employing a fifth embodiment of the compressor mounting of the present invention.
FIG. 15 is a partially sectioned view of a hermetic compressor employing a sixth embodiment of the compressor mounting of the present invention.

In FIG. 14, the base pan 312 is made of plastic and includes annular extension 312-1 which defines a recess for receiving isolator 30. Compressor 110 has been modified by eliminating pins 10-2 although pin 10-1 would be present. Side torsional isolator mountings 121-1 and 121-2 do not have annular extension structure for receiving torsion isolators 132. Torsion isolators 132 are adhesively secured to either compressor 110 or isolator mountings 121-1 and 121-2 while frictionally engaging either compressor 110 or isolator mountings 121-1 and 121-2. Alternatively, isolators 132 may be adhesively secured to compressor 10 and to mountings 121-1 and 121-2, respectively. Frictional engagement between isolators 132 and compressor 110 and mountings 121-1 and 121-2 is possible but will require that mountings 121-1 and 121-2 provide a spring bias against isolators 132 to maintain the frictional engagement.

Referring now to FIG. 15, compressor 110 is used in the compressor mounting structure of FIG. 3. Because compressor 110 lacks pins 10-2, isolators 132 are used, as in the FIG. 14 embodiment, and are glued to or frictionally engage compressor 110.

Figures 16, 17:
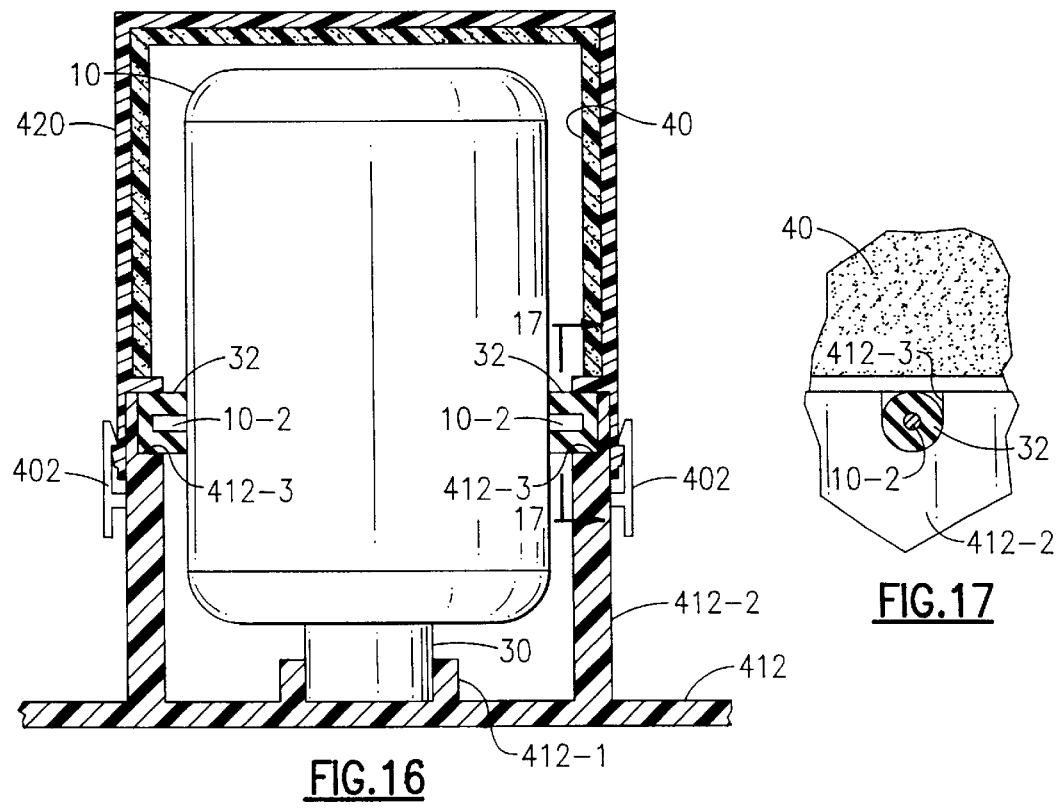
FIG. 16 is a partially sectioned view of a hermetic compressor employing a seventh embodiment of the compressor mounting of the present invention.
FIG. 17 is a sectional view taken along line 17—17 of FIG. 16.

Referring now to FIGS. 16 and 17, the base pan 412 incorporates all of the compressor mounting structure. Annular extension 412-1 corresponds to annular extension 312-1 of FIG. 14 and defines a recess which receives vibration isolator 30. Additionally, outer annular extension 412-2 incorporates the torsion isolator mounting. While it is not necessary, preferably pins 10-2 and hence torsion isolators 32 are located at the same axial height to facilitate manufacture. Recesses 412-3 corresponding to annular extensions 21-1, 22-1 and 23-1 are formed in the inner wall of outer annular extension 412-2. Recesses 412-3 do not extend through annular extension 412-2, have a depth in the axial direction of the compressor 10 corresponding to the diameter of isolators 32 and are of a U-shape. Shell 420 receives the upper end of annular extension 412-2 and is secured thereto by any suitable means such as clasps or latches 402. Shell 420 is lined and/or covered with acoustical lining 40.

Referring now to FIG. 18 it will be initially noted that it generally corresponds to the compressor mounting arrangement of FIG. 16 without shell 420. In the absence of shell 420, it is necessary, or at least desirable, to provide structure for holding isolators 32 in place. Referring to FIGS. 18–20, base pan 512 has an integral inner annular extension 512-1 corresponding to 412-1 of FIG. 16, and an integral outer annular extension 512-2. At least two recesses 512-3 corresponding to recesses 412-3 are formed in the inner wall of outer annular extension 512-2. Recesses 512-3 do not extend through annular extension 512-2 and have a depth in the axial direction of the compressor 10 such that the axes of pins 10-2 are within the recesses. Accordingly, most, if not all, of each of the isolators 32 is within the U-shaped recesses 512-3. As best shown in FIG. 20, torsion isolators, typically, extend above annular extension 512-2 and are overlain and held in place by any suitable means such as resiliently deformable retainer 550 which snaps in place to prevent movement of isolator 32 out of recess 512-3.

Figure 21:
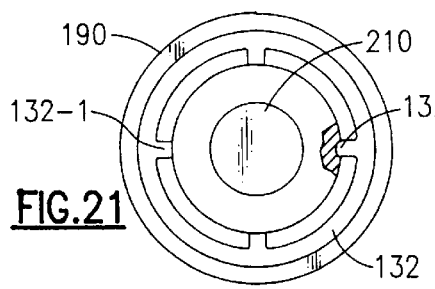
FIG. 21 is a top, partially cutaway view of a second modified torsion isolator.
Figure 22:
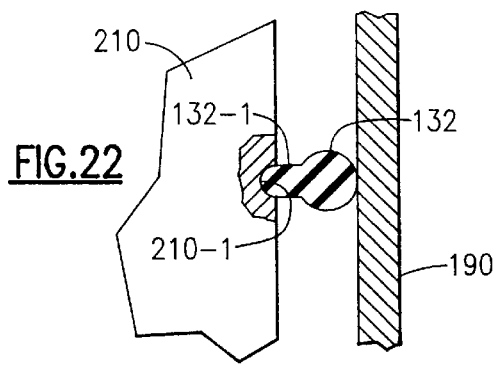
FIG. 22 is a partially cutaway, sectional view of the torsion isolator of FIG. 21.

Referring to FIGS. 21 and 22, compressor 210 has been modified by providing a plurality of circumferentially spaced, radially extending depressions 210-1. Compressor 210 is located within a shell 190. Torsion isolators 32 have been replaced by annular member 132. Annular member 132 generally corresponds to an O-ring with a plurality of circumferentially spaced, radially inward extending portions 132-1 which are received in depressions 210-1. With portions 132-1 received in depressions 210-1 and with member 132 in frictional engagement with the inner surface of shell 190, portions 132-1 of member 132 correspond to torsion isolators 32 in resisting torsional movement of compressor 210.

Figure 23:
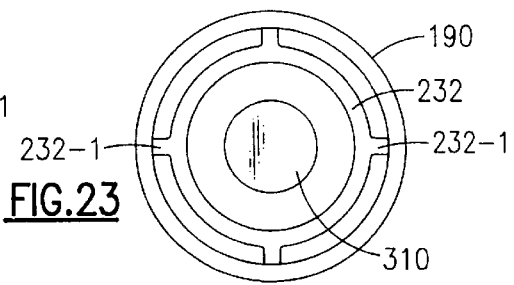
FIG. 23 is a top view of a third modified torsion isolator.
Figure 24:
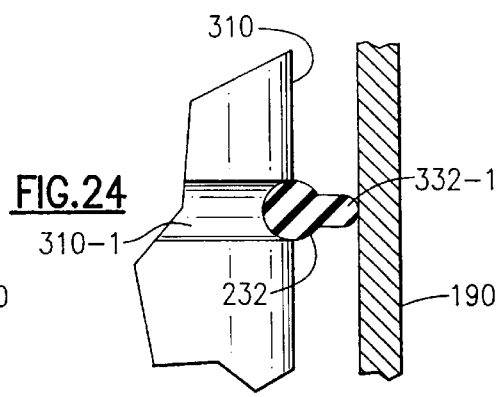
FIG. 24 is a partially sectioned view of the torsion isolator of FIG. 23.

Referring to FIGS. 23 and 24, compressor 310 has been modified by providing a circumferential groove 310-1 in the shell of compressor 310. Compressor 310 is located within shell 190. Torsion isolators 32 have been replaced by annular member 232. Annular member 232 generally corresponds to an O-ring with a plurality of circumferentially spaced, radially outward extending portions 232-1. Member 232 is frictionally received in groove 310-1 and portions 232-1 are in frictional engagement with the inner surface of shell 190 and correspond to torsion isolators 32 in resisting torsional movement of compressor 310.

Figure 25:
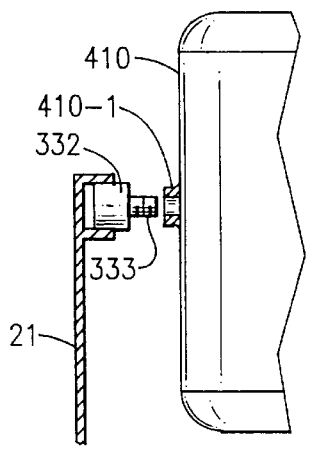
FIG. 25 is an exploded, partially sectioned view of a fourth modified torsion isolator.
Figure 26:
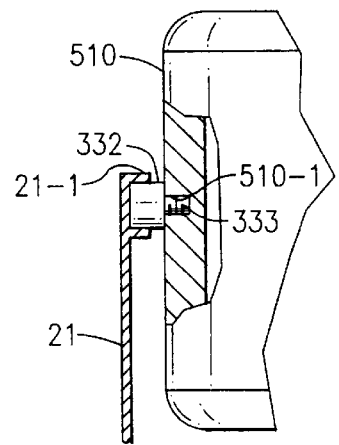
FIG. 26 is a partially sectioned view of a fifth modified torsion isolator.

In FIG. 25, rather than welding pins 10-2 to the shell of compressor 410, a threaded member 410-1, which corresponds to a nut, is welded or otherwise suitably secured to the shell of compressor 410. The torsion isolator 332 is modified relative to torsion isolator 32 by making threaded member 333 an integral part of isolator 332. Member 333 is threaded into member 410-1. Alternatively, threaded member 333 can be a separate part which is threaded into member 410-1 and then received in torsion isolator 32. In FIG. 26, the compressor 510 has a shell thickness sufficient to accommodate a threaded hole 510-1 being formed therein to receive threaded member 333 without compromising its integrity. Otherwise the embodiments of FIGS. 25 and 26 are the same.

Figure 27:
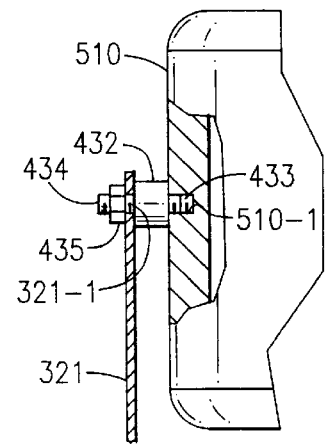
FIG. 27 is a partially sectioned view of a sixth torsion isolator.
Figure 28:
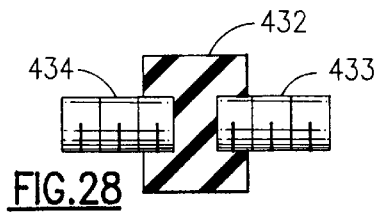
FIG. 28 is a partially sectioned view of the torsion isolator of FIG. 27.

In the embodiment of FIGS. 27 and 28, the compressor 510 of FIG. 26 is used. The torsion isolator 432, as best seen in FIG. 28, has two axially spaced threaded members 433 and 434. Threaded member 433 is threadably received in threaded hole 510-1. Side torsion isolator mounting 321 has been modified relative to mounting 21 by eliminating annular extension 21-1 and by providing a hole 321-1 through which threaded member 434 extends. Nut 435 is threaded onto threaded member 434. Because threaded member 433 is fixed relative to compressor 510 and threaded member 434 is fixed relative to mounting 321, the torsional movement and the resistance thereto is provided by the portion of torsion isolator 432 located between axially spaced threaded members 433 and 434.

Figure 29:
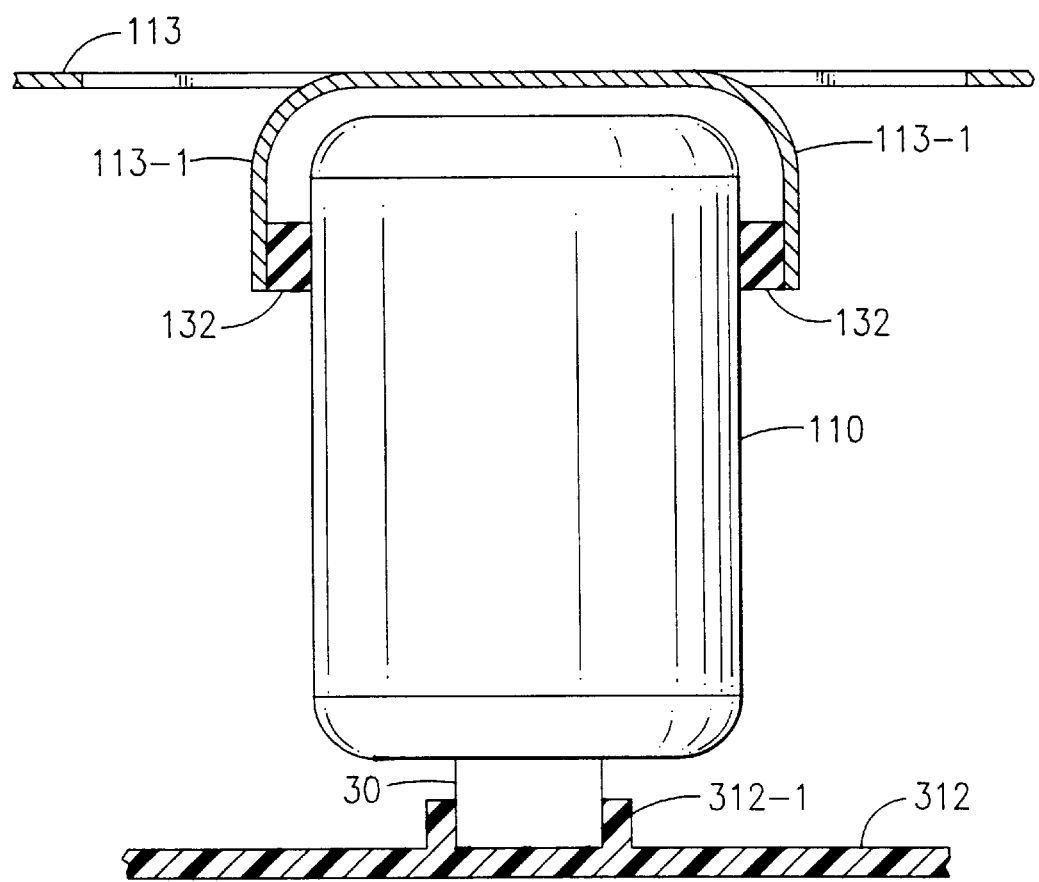
FIG. 29 is a partially sectioned view of a ninth embodiment of the compressor mounting of the present invention.

In FIG. 29, the torsion isolator mounting structure extends from above compressor 110 and is illustrated as integral with a portion of the housing structure, specifically overlying member 113 which may be a cover. Overlying member 113 has two or more members, 113-1 radially extending with respect to the axis of compressor 110, formed and bent downwardly in the nature of earmuffs relative to compressor 110. Torsion isolators 132 are best glued or otherwise suitably secured to members 113-1 and compressor 110 unless the inherent resilience of members 13-1 is sufficient to provide a sufficient frictional engagement between isolator 132 and one of the members. Alternatively, members 113-1 may be made separate from member 113 and secured thereto. One or more isolator mountings such as 21 and 22 of FIGS. 1–4 may be secured to member 113 in combination or substitution for members 113-1 as where space limitations do not permit their attachment to base pan 112.

The operation of all of the embodiments of FIGS. 1–29 have a number of common features and the same numerals have been used to identify common structure in the various embodiments. First, in every embodiment most, if not all, of the weight of the compressor is supported by vibration isolator 30 which is located beneath the compressor. Second, structure is located radially outward of the compressor. Third, torsion isolator structure is located between the compressor and the structure located radially outward thereof and coacts therewith at a number of circumferentially spaced locations so as to resist torsional movement of the compressor relative to the structure located radially outward thereof. Fourth, the torsion isolators are axially spaced from the vibration isolator to better resist tipping motion of the compressor.

In the operation of all embodiments of the present invention, a pin 10-1 is integrally secured to the bottom of compressors 10, 110, 210, 310, 410 and 510 at a location generally corresponding to the axis of compressors 10, 110, 210, 310, 410 and 510. Alternatively, eliminating pin 10-1 and providing an adhesive connection can be done. Pin 10-1 is snugly received in bore 30-1 of isolator 30 and isolator 30 is snugly received in the recess defined by 20-1, 112-1, 212-1, 312-1, 412-1 or 512-1 depending upon the embodiment. Isolator 30 supports most, if not all, of the weight of compressor 10, 110, 210, 310, 410 and 510 which contributes to the tightness of the fit of pin 10-1 in bore 30-1 and isolator 30 in recess 20-1, 112-1, 212-1, 312-1, 412-1 or 512-1 when compressor 10, 110, 210, 310, 410 and 510 are in place. In the embodiments of FIGS. 1–4, 7–13 and 16–20 pins 10-2 are integrally secured to the sides of compressors 10, 110, 210, 310, 410 and 510 in circumferentially, and preferably axially, spaced locations. Pins 10-2 are snugly received in bores 32-1 of isolators 32 and isolators 32 are snugly received in the recesses of annular extensions 21-1 and 22-1, 220-1 and 221-1, or slots 122-1 and 122-2 depending upon the embodiment. Isolators 32 support little, if any, weight of the compressor 10 but they resiliently resist the torsional and tipping movement of compressor 10.

Since isolator 30 is relatively large in diameter, i.e. on the order of one to five inches, it provides a stable, resilient support for the weight of compressor 10 during operation and shipping/handling. Other than providing a base, isolator 30 does not significantly resist the tipping or rotational movement of compressor 10. Isolators 32 provide resistance to tipping and rotational or torsional movement. Pin 10-1 provides the fulcrum/axis for tipping or rotation and isolators 32 are both radially and axially spaced from pin 10-1 so as to resist both modes of movement.

Preferably isolators 32 are not circumferentially spaced much more than 180° in any direction since movement of pins 10-2 relative to isolators will not be resisted in a direction going from transverse towards axial as the spacing increases from 180°. The spacing can be increased to about 190°, if necessary, without serious problems. Symmetry is not required for locating isolators 32 so that their location to accommodate other parts generally presents no problems absent that described with respect to spacing in excess of 180°.

The embodiments of FIGS. 14, 15 and 21–29 use modified torsion isolators. In the embodiments of FIGS. 14, 15 and 29 the torsion isolator 132 is glued to one member. In FIG. 15 the torsion isolator is glued to compressor 132 at one end and received in annular extensions 21-1 and 22-1 at the other end. In the FIG. 14 and 29 embodiments the torsion isolator 132 is preferably glued to compressor 110 at one end and to torsional mounting members 121-1 and 121-2, and 113-1, respectively. If there is a sufficient resilience in members 121-1 and 121-2, and 113-1, there may be a frictional contact at one end of isolators 132.

Although preferred embodiments of the present invention have been illustrated and described, other changes will occur to those skilled in the art. For example, it may be possible to mount one or more of isolators in modified existing structure of the air conditioning or heat pump unit. Because of the need to accommodate the suction and discharge lines, the power line, an accumulator, etc. space restraints may dictate modifications. While a single large isolator 30 is preferred, two, or more, smaller isolators may be used within the spirit of the present invention if they are located reasonably close to the axis of the compressor/center of gravity. Pins 10-2 may be in other than a horizontal plane as long as there is a major radial component. Compressor 10 may also be suspended within the spirit of the present invention. Specifically, if pin 10-1 is replaced by a threaded pin located at the top of compressor 10 which serially passes through a vibration isolator 30, the support structure, preferably a resilient material washer and is threadably received in a nut which is tightened such that vibration isolator 30 contacts compressor 10 and the support structure, the weight of compressor 10 will be equivalently supported. The various features can be used in combinations other than those shown. The base pan material dictates some of the embodiments as moldable material is required for the embodiments of FIGS. 16–20. The shell may cover less than the full compressor due to space constraints as well as due to the accommodation of piping, wiring etc. It is therefore intended that the scope of the present invention is to be limited only by the scope of the appended claims.

What is claimed is:

1. Means for mounting a compressor comprising:

a vertically oriented compressor having an axis;

means for supporting said compressor;

means for providing vibration isolation located between said means for supporting said compressor and said compressor;

means for securing and supporting said means for vibration isolation;

means for providing torsion isolation including at least two torsion isolators;

means for resisting torsional movement located radially outward of said compressor;

said means for providing torsion isolation being located between, and coacting with, said compressor and said means for resisting torsional movement such that torsional movement of said compressor with respect to said means for resisting torsional movement is limited.

2. The means for mounting a compressor of claim 1 wherein said at least two torsion isolators are circumferentially spaced from each other no more than 190° in a circumferential direction.

3. The means for mounting a compressor of claim 2 wherein said at least two torsion isolators are axially spaced from said means for providing vibration isolation.

4. The means for mounting a compressor of claim 1 wherein said at least two torsion isolators are axially spaced from said means for providing vibration isolation.

5. The means for mounting a compressor of claim 1 wherein said means for resisting torsional movement includes a shell covering at least a portion of said compressor.

6. The means for mounting a compressor of claim 5 wherein said shell has acoustical insulating material on surfaces of said shell.

7. The means for mounting a compressor of claim 5 wherein said shell is made up of at least two pieces.

8. The means for mounting a compressor of claim 7 wherein said shell has acoustical insulating material on surfaces of said shell.

9. The means for mounting a compressor of claim 1 wherein said compressor includes a first projection extending downward and received in said means for providing vibration isolation which supports at least some of the weight of said compressor.

10. The means for mounting a compressor of claim 9 wherein said compressor includes second, radial projections received in said torsion isolators.

11. The means for mounting a compressor of claim 1 wherein said compressor includes radial projections received in said torsion isolators.

12. The means for mounting a compressor of claim 1 wherein said means for supporting said compressor and said means for resisting torsional movement are integral.

13. The means for mounting a compressor of claim 1 wherein said means for supporting a compressor is a base pan of an air conditioning unit and said means for securing and supporting said means for vibration isolation is integral with said base pan.

14. The means for mounting a compressor of claim 13 wherein said means for resisting torsional movement is integral with said base pan.

15. The means for mounting a compressor of claim 14 further including a shell secured to said means for resisting torsional movement and coacting therewith to acoustically isolate said compressor.

16. Means for mounting a compressor comprising:

a vertically oriented compressor having an axis;

means for supporting said compressor;

means for providing vibration isolation located between said means for supporting said compressor and said compressor;

means for securing and supporting said means for vibration isolation;

means for providing torsion isolation including at least two torsion isolators circumferentially spaced from each other;

means for resisting torsional movement located radially outward of said compressor;

a shell covering at least a portion of said compressor;

said means for providing torsion isolation being located between, and coacting with, said compressor and said means for resisting torsional movement such that torsional movement of said compressor with respect to said means for resisting torsional movement is limited.

17. The means for mounting a compressor of claim 16 wherein said shell includes said means for resisting torsional movement.

18. The means for mounting a compressor of claim 17 wherein said shell has acoustical insulating material on surfaces of said shell.

19. The means for mounting a compressor of claim 16 wherein said shell is made up of at least two pieces.

20. The means for mounting a compressor of claim 19 wherein said shell has acoustical insulating material on surfaces of said shell.

21. The means for mounting a compressor of claim 16 wherein said means for supporting said compressor and said means for resisting torsional movement are integral.

22. The means for mounting a compressor of claim 21 wherein said means for supporting a compressor is a base pan of an air conditioning unit and said means for securing and supporting said means for vibration isolation is integral with said base pan.

23. The means for mounting a compressor of claim 22 wherein said means for resisting torsional movement is integral with said base pan.

24. The means for mounting a compressor of claim 16 wherein said shell is secured to said means for supporting a compressor.

25. The means for mounting a compressor of claim 24 wherein said means for supporting said compressor and said means for resisting torsional movement are integral.

26. The means for mounting a compressor of claim 25 wherein said means for supporting a compressor is a base pan of an air conditioning unit and said means for securing and supporting said means for vibration isolation is integral with said base pan.

* * * * *